United States Patent [19]

Phillips et al.

[11] Patent Number: 4,838,648

[45] Date of Patent: Jun. 13, 1989

[54] THIN FILM STRUCTURE HAVING MAGNETIC AND COLOR SHIFTING PROPERTIES

[75] Inventors: Roger W. Phillips; Paul G. Coombs, both of Santa Rosa, Calif.

[73] Assignee: Optical Coating Laboratory, Inc., Santa Rosa, Calif.

[21] Appl. No.: 189,779

[22] Filed: May 3, 1988

[51] Int. Cl.$^4$ .............................................. G02B 5/28
[52] U.S. Cl. ..................................... 350/166; 283/91; 283/94; 283/902
[58] Field of Search .................... 350/166; 283/91, 94, 283/902

[56] References Cited

U.S. PATENT DOCUMENTS

| 4,705,300 | 11/1987 | Berning et al. | 283/91 |
| 4,705,356 | 11/1987 | Berning et al. | 350/166 |
| 4,779,898 | 10/1988 | Berning et al. | 283/91 |

Primary Examiner—Bruce Y. Arnold
Attorney, Agent, or Firm—Flehr, Hohbach, Test, Albritton & Herbert

[57] ABSTRACT

Thin film structure having magnetic properties and optically variable properties comprising a substrate and a multilayer interference coating carried by the substrate producing an inherent color shift with angle. The interference coating has a metal-dielectric design which includes a metal which has magnetic as well as reflective properties.

11 Claims, 1 Drawing Sheet

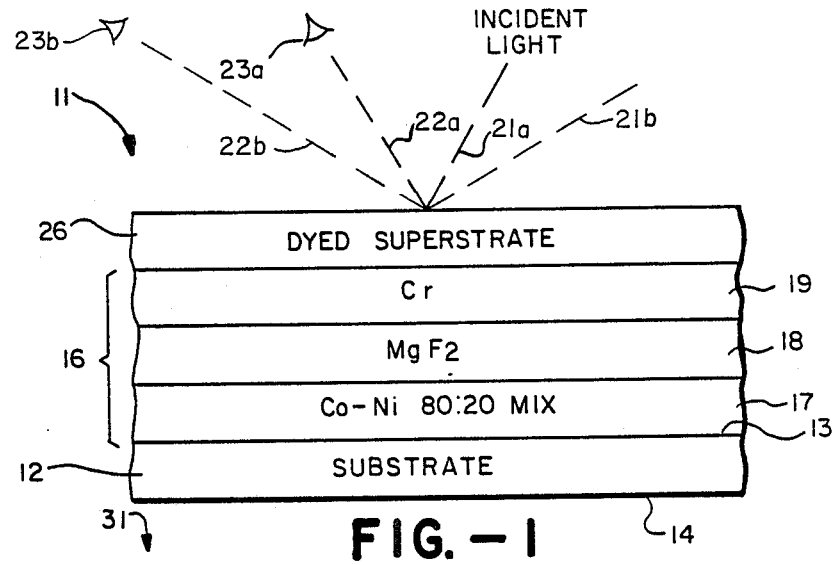
FIG.—1
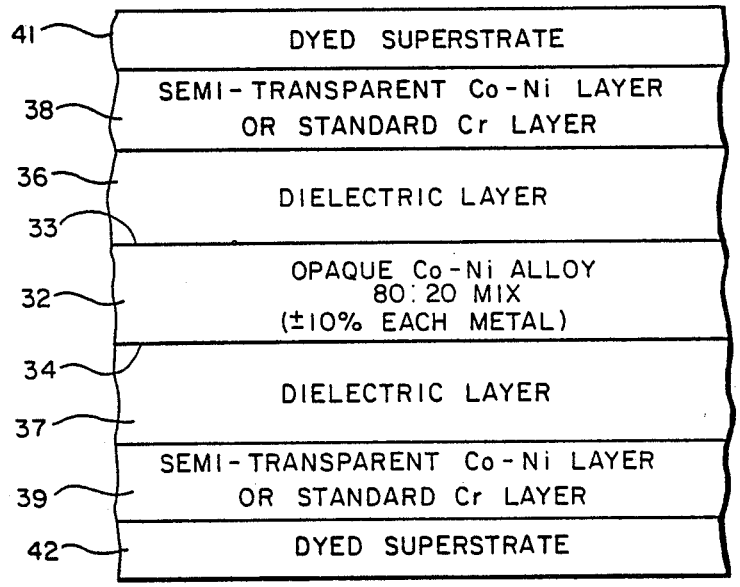
FIG.—2
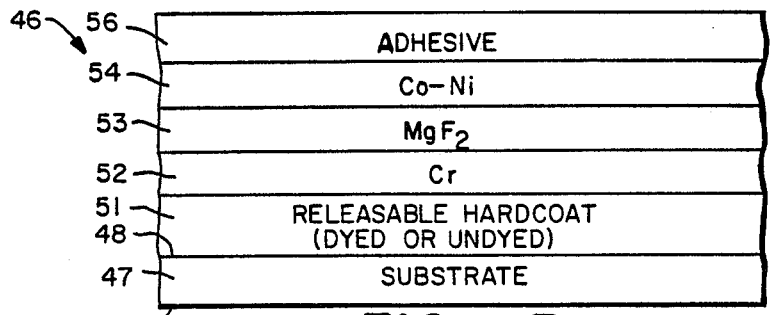
FIG.—3 ated in U.S. Pat. No. 4,705,356. However, it has been found when such an article is utilized in security applications as well as in anticounterfeit applications there is a need for additional security This is true is both pigment and device applications.

THIN FILM STRUCTURE HAVING MAGNETIC AND COLOR SHIFTING PROPERTIES

This invention relates to a thin film structure having magnetic and optically variable characteristics and more particularly to a magnetic optically variable pigment and device.

Optically variable articles having substantial color shift with angle have been disclosed in U.S. Pat. No. 4,705,356. However, it has been found when such an article is utilized in security applications as well as in anticounterfeit applications there is a need for additional security This is true is both pigment and device applications.

In general, it is an object of the present invention to provide a thin film structure having both magnetic and optically variable characteristics.

Another object of the invention is to provide a pigment and device of the above character which can be readily manufactured.

Additional objects and features of the device will appear from the following description in which the preferred embodiments are set forth in detail in conjunction with the accompanying drawings.

FIG. 1 is a cross sectional view of a magnetic color shifting optically variable device incorporating the present invention.

FIG. 2 is a cross sectional view of a magnetically optically variable pigment incorporating the present invention.

FIG. 3 is a cross sectional view of a device incorporating the present invention which is transferable.

In general, the thin film structure having magnetic and optically variable properties consists of a multilayer layer interference coating which produces an inherent color shift with angle. The interference coating has a metal-dielectric design. The metal utilized in the design has magnetic properties to permit recording of information magnetically in the metal. When it is desired to produce a specific color shift in reflection from one color to another by removing certain colors, or to modify the color shift properties, a subtractive colored superstrate is provided external of the multilayer interference coating on the side of the multilayer interference coating facing the incident light. The colored superstrate (also called a subtractive colorant means) in combination with a multilayer interference coating serves to modify the inherent color shift produced by the multilayer interference coating. This combination of a subtractive colorant means and the multilayer interference coating provides a discrete color shift from one distinct color to another at two different angles of incidence, and/or modifies the colors produced by the interference coating. More particularly, as shown in FIG. 1, a thin film structure is in the form of a magnetic color shifting optically variable device 11. As shown therein, it consists of a substrate 12 which can be formed of a suitable material such as PET or other suitable material as set forth in U.S. Pat. No. 4,705,356. The substrate 12 is provided with first and second surfaces 13 and 14. A multilayer interference coating 16 is provided on the first surface 13. As described in U.S. Pat. No. 4,705,356, the multilayer interference coating 16 has a metal-dielectric design which consists of a periodic structure of alternating metal and dielectric layers on a relatively high reflecting opaque metal layer 17.

As explained in U.S. Pat. No. 4,705,356, the metal dielectric design in its simplest form can be a three layer combination such as shown in FIG. 1. In such a design, the first metal layer 17 is preferably a highly reflecting metal layer. In accordance with the present invention rather than using a highly reflective non-magnetic metal layer such as aluminum, the metal is chosen so that in addition to having high reflecting properties it also has magnetic qualities for a purpose hereinafter described. One metal found to be particularly suitable for this application is a cobalt nickel alloy with a ratio by weight of 80% cobalt and 20% nickel plus or minus 10% for each metal. Such a metal layer is deposited on the surface 13 to a thickness so that it is substantially opaque. An optical spacer layer 18 in the form of a suitable dielectric (i.e., having a low index of refraction) such as magnesium fluoride is deposited on the cobalt nickel layer 17. A metal with high absorption properties is then deposited on the dielectric layer 18 to provide an absorber layer 19. One metal found to be suitable for this is chromium. Other metals which have such high absorption characteristics can be selected in the manner suggested in U.S. Pat. No. 4,705,356.

It should be appreciated that the basic reflectance profile for the three-layer metal-dielectric design for the interference filter 16 would be essentially retained in designs employing additional periods of the thin metal and dielectric. The multilayer interference coating 16 provides an inherent color shift with the change in viewing angle. In FIG. 1, the incident light is indicated by ray 21a or ray 21b and the reflected light is indicated by ray 22a or 22b as viewed by the eye 23a or 23b. At the eye position of 23a one sees one color, Color A, and at position 23b another color, Color B.

When it is desired to produce a specific color shift or to eliminate certain colors, subtractive colorant means is provided external of the multilayer interference coating on the side of the multilayer interference coating 16 facing the incident light. This subtractive colorant means in combination with a multilayer interference coating serves to modify the inherent color shift produced by the multilayer interference coating to provide a discrete color shift from one distinct color to another distinct color at two different angles of incidence. This subtractive colorant means can take the form of a dyed superstrate 26 as shown in FIG. 1. The dyed superstrate 26 must be optically thick and have a minimum thickness in the range of about 1.5 to 2.0 microns.

The optically variable device or structure shown in FIG. 1 can be utilized in the manner described in U.S. Pat. No. 4,705,356. In addition, it can be utilized to encode information in the magnetic layer 17 For example, it could record the typical information which is carried by a credit card in a magnetic stripe. It also could be utilized for putting the numbers on the bottoms of checks so that the information carried by the check could be read magnetically as with present day checks and still provide the optical variable feature.

It also should be appreciated that the present invention can be incorporated in a magnetic and optically variable ink by providing flakes in the manner described in said copending application Ser. No. 812,814, filed on Dec. 23, 1985.

It should be appreciated that if desired in place of the chromium absorber layer, the absorber layer also could be formed of the cobalt nickel alloy. This simplifies the manufacture of the magnetic optically variable device or structure by only using a single metal and a single dielectric.

Another embodiment of the thin film structure having magnetic and optically variable properties is shown in FIG. 2 and takes the form of a magnetic optically variable pigment. As shown in FIG. 2, this pigment is comprised of a symmetrical design which lends itself to being broken up into flakes which can be utilized in making pigment in the manner described in co-pending application Ser. No. 812,814, filed on Dec. 23, 1985. The symmetrical design 31 shown in FIG. 2 is formed using a reflecting metallic layer which also has magnetic properties. As explained in connection with the previous embodiment, the metal is selected for its reflecting properties as well as its magnetic properties. The metal is deposited to a thickness so that it is substantially opaque. One metal found to be satisfactory is a cobalt nickel alloy with the cobalt nickel having a ratio by weight of 80% and 20% respectively. This ratio for each of the metals can be varied by plus or minus 10% and still achieve the desired results. The reflecting layer 32 is provided with first and second reflecting surfaces 33 and 34. Dielectric spacer layers 36 and 37 are provided on the surfaces 33 and 34 and are formed of a suitable low index of refraction material such as magnesium fluoride. Metallic absorber layers 38 and 39 formed of a suitable absorber metal such as chromium are deposited on the dielectric layers 36 and 37. They are deposited to a thickness so that they are semi-transparent. As pointed out previously, when it is desired to use only a single metal in the structure, the chromium layer can be replaced with the cobalt nickel alloy utilized for the reflecting layer 32.

If a specific color shift is desired or if it is desired to remove certain colors, dyed superstrates 41 and 42 are provided on the metal layers 38 and 39 to provide subtractant colorant means of the type hereinbefore described in connection with FIG. 1.

The structure which is shown in FIG. 2 can be prepared in flake form in the manner described in co-pending application Ser. No. 812,814 filed Dec. 23, 1985. The symmetrical design particularly lends itself to such an application. In utilizing flakes formed from the structure shown in FIG. 2, a magnetic optically variable pigment can be provided in which magnetic information can be encoded in the paint incorporating the pigment or in which the pigment simply exhibits magnetic properties so that it can be utilized in credit cards, checks and the like in the manner hereinbefore described.

An alternate construction of a device incorporating the present invention is shown in FIG. 3 which is transferrable and generally comprises a metal dielectric thin film stack which can be provided with or without a subtractive colorant placed on a releasable hardcoat substrate which can be transferred to another substrate. This device 46 as shown in FIG. 3 consists of a transparent flexible substrate formed of a suitable material such as PET. The substrate 47 is provided with surfaces 48 and 49. A releasable hardcoat or releasable layer 51 is deposited on the surface 48 and is of a conventional type. The release layer 51 can be formed of any suitable material such as a wax, silicone or acrylic and can have a suitable thickness such as approximately 1 micron. If desired, the releasable material should be one which can be carry a color so that a dyed releasable hardcoat can be provided when that effect is desired. When the release layer is dyed it provides the sub-subtractive colorant means in the dyed superstrates in the previous embodiments of the present invention.

A metallic layer 52 is deposited on the release layer 51 and is formed of a suitable material such as chromium. This metallic layer serves as one of the metal layers in the metal dielectric stack. The dielectric is formed by a layer 53 formed of a suitable dielectric having a low index of refraction as, for example, magnesium fluoride. Another metal layer 54 formed of a cobalt nickel composition of the type hereinbefore described as, for example, an 80–20% by weight mixture is disposed on the dielectric layer 53. An adhesive layer 56 is deposited on the metal layer 54. The adhesive can be a conventional hot stamp adhesive or other suitable type of adhesive such as a pressure sensitive adhesive. The adhesive layer 56 can have a suitable thickness such as approximately ½ mil. The metal dielectric stack which is shown in FIG. 3 can be readily transferred to another article.

When it is desired to make a transfer, a hot die stamp can be utilized to stamp out the desired image and to heat the adhesive so that the adhesive will adhere to the transfer substrate at the places where it is heated. Thus the device of the present invention will only be transfered in the areas where heat has been applied.

It should be appreciated that with a device such as shown in FIG. 3, it is possible to place the adhesive on the counter surface in predetermined locations. A roll-on transfer can then be utilized which will cause the device to stick where the adhesive is present and not to stick where the adhesive is not present so that a pattern can be provided if the device is provided on the counter surface.

It should be appreciated that in accordance with the present invention, the structure or device can be placed in a bar code pattern which would produce an optically variable bar code device that would appear on a label or on the article itself Such a bar code would function as an optically variable bar code that could be read by both optical and magnetic readers. Such a bar code optically variable device would provide three security features, the bar code itself, the optically variable characteristic and the magnetic characteristic.

From the foregoing it can be seen that where has been provided a thin film structure which has both magnetic and optically variable properties which end itself to many different types of applications, particularly where additional security is desired.

What is claimed is:

1. In a thin film structure having magnetic properties and optically variable properties, a substrate and a multilayer interference coating carried by the substrate producing an inherent color shift with angle, said interference coating having a metal-dielectric design which includes a metal which has magnetic as well as reflective properties.

2. A structure as in claim 1 wherein said metal having reflecting and magnetic properties is a cobalt nickel alloy.

3. A structure as in claim 2 wherein said cobalt nickel alloy is a composition of 80% cobalt and 20% nickel by weight plus or minus 10% for each metal in the alloy.

4. A structure as in claim 1 together with subtractive colorant means external of the multilayer interference coating on the side of the multilayer interference coating facing the incident light, said subtractive colorant means in combination with a multilayer interference coating serving to modify the inherent color shift produced by the multilayer interference coating to provide a discrete color shift from one distinct color to another color at two different angles of incidence.

5. A structure as in claim 1 wherein said subtractive colorant means is in the form of a dyed superstrate.

6. A structure as in claim 1 together with a release layer disposed between the interference coating and the substrate.

7. A structure as in claim 6 together with an adhesive carried by the interference coating, said adhesive being exposed to the ambient.

8. A structure as in claim 7 wherein said metallic layer having highly reflecting and magnetic properties is comprised of a cobalt nickel alloy.

9. A structure in claim 6 together with subtractive colorant means carried by each of the opposite sides of the symmetrical multilayer interference coating.

10. In a thin film structure having substantial color shift with angle of light incidence and viewing, a symmetrical multilayer interference coating producing an inherent color shift with angle, said symmetrical multilayer interference coating being a metal layer formed of a metal which is highly reflecting and which has magnetic properties and a dielectric layer disposed on opposite sides of the metal layer and a metallic absorber layer disposed on each of the dielectric spacer layers.

11. A structure as in claim 10 wherein said cobalt nickel alloy has a composition of approximately 80–20% by weight respectively of cobalt and nickel plus or minus 10% for each metal in the alloy.

* * * * *